United States Patent [19]

Gould

[11] Patent Number: 5,081,695
[45] Date of Patent: Jan. 14, 1992

[54] BEND RESTRICTOR FOR OPTICAL FIBRE CABLE

[75] Inventor: Colin A. Gould, Ipswich, England

[73] Assignee: British Telecommunications public limited company, Great Britain

[21] Appl. No.: 671,815

[22] PCT Filed: Oct. 4, 1989

[86] PCT No.: PCT/GB89/01175
§ 371 Date: Apr. 2, 1991
§ 102(e) Date: Apr. 2, 1991

[87] PCT Pub. No.: WO90/04800
PCT Pub. Date: May 3, 1990

[30] Foreign Application Priority Data
Oct. 17, 1988 [GB] United Kingdom ............ 8824246

[51] Int. Cl.⁵ ................... G02B 6/44; H02G 3/00
[52] U.S. Cl. .................................... 385/107; 385/99; 385/105; 174/70 R; 174/70 S; 174/75 R
[58] Field of Search .............. 350/96.20, 96.21, 96.22, 350/96.23; 174/70 S, 70 R, 72 C, 73.1, 75 R

[56] References Cited

U.S. PATENT DOCUMENTS

| | | | |
|---|---|---|---|
| 3,082,291 | 3/1963 | Parkinson et al. | 174/70 S |
| 3,516,830 | 5/1985 | Guazzo | 350/96.22 |
| 4,245,134 | 1/1981 | Oldham et al. | 174/70 S |
| 4,259,543 | 3/1981 | Oldham | 174/705 |
| 4,313,028 | 1/1982 | Oldham et al. | 174/70 S |
| 4,427,262 | 1/1984 | Oldham | 350/96.23 |
| 4,447,115 | 5/1984 | Guazzo et al. | 174/70 S |
| 4,630,888 | 12/1986 | Dubar | 350/96.23 |
| 4,699,459 | 10/1198 | Priaroggia | 350/96.21 |
| 4,790,648 | 12/1988 | Ohta et al. | 350/96.20 |
| 4,813,754 | 3/1989 | Priaroggia | 350/96.23 |

FOREIGN PATENT DOCUMENTS

| | | | |
|---|---|---|---|
| 0042996 | 1/1982 | European Pat. Off. | 350/96.23 X |
| 59-160103 | 1/1985 | Japan | 350/96.23 X |
| 2165663 | 4/1986 | United Kingdom | 350/96.23 X |

OTHER PUBLICATIONS

Furukawa et al., "Structural Design . . . Optical Fiber Cable Joint Box" J. of Lightwave Tech., vol. LT-2, No. 4, 8/84, pp. 550–555.

Niiro, "Optical Fiber Submarine Cable . . . " IEEE Journal, vol. SAC-1, No. 3, 4/83, pp. 467–478.

Gould, "Cable-to-Repeater Connection . . . " British Telecom Eng., vol. 5, 7/86, pp. 104–108.

Primary Examiner—Brian Healy
Attorney, Agent, or Firm—Nixon & Vanderhye

[57] ABSTRACT

A bend restrictor for an optical fibre cable comprises an elongate sleeve-like member (5) having an axial through bore for accommodating the cable (1a, 1b), and a coupling ring (6) for fixing the sleeve-like member to a rigid housing (4) from which the cable extends. The sleeve-like member (5) is provided with a plurality of longitudinal bores (7), into some or all of which can be fitted stiffening rods (8). By varying the number and lengths of the stiffening rods (8), the rigidity of the sleeve-like member (5) can be varied to suit the particular structure of the cable (1a, 1b).

11 Claims, 2 Drawing Sheets

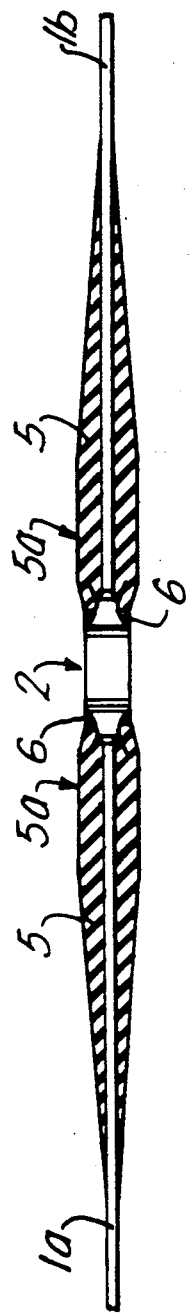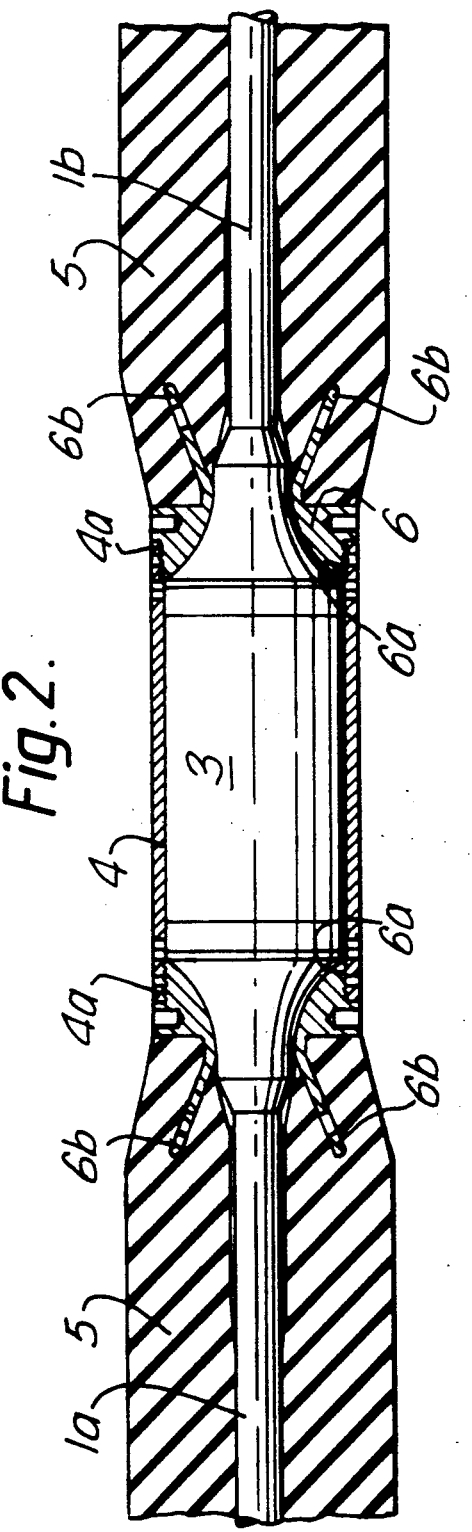

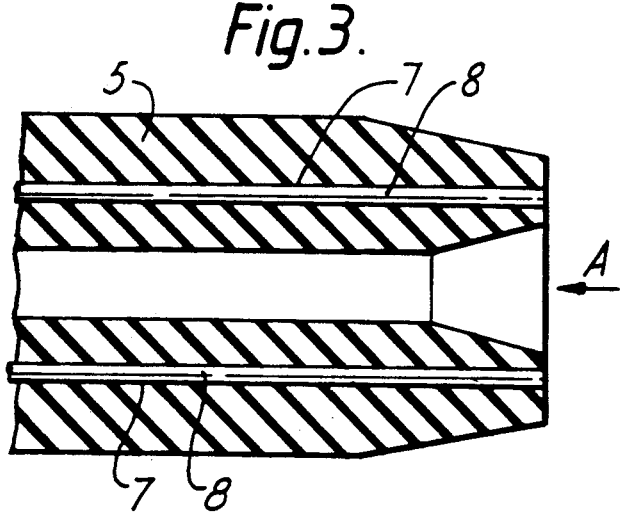
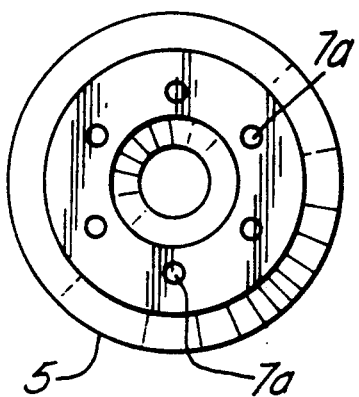
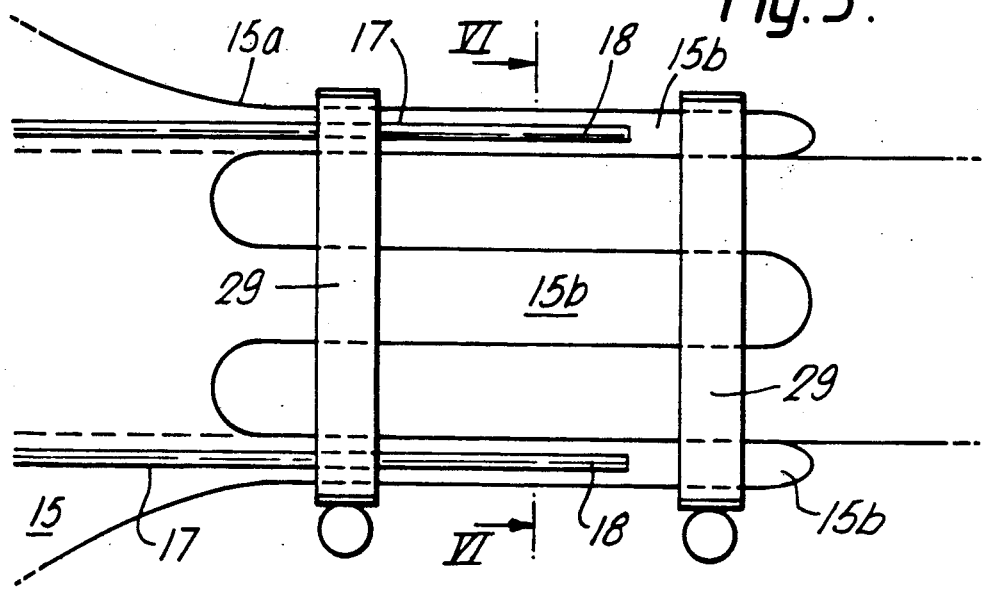
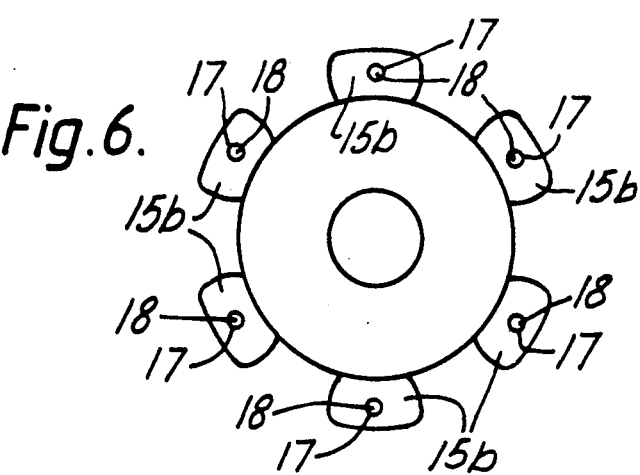

BEND RESTRICTOR FOR OPTICAL FIBRE CABLE

BACKGROUND OF THE INVENTION

This invention relates to a bend restrictor for optical fibre cable, and in particular to a bend restrictor for preventing a submarine optical fibre cable bending too much at a joint.

A submarine optical fibre cable has a plurality of optical fibres at its centre, the optical fibres being surrounded by a copper tube, which in turn is surrounded by two layers of helically-wound steel wires which are encapsulated in plastics material. The steel wires carry longitudinal cable forces, and the copper tube carries electrical power to components such as repeaters spaced along the cable. The optical fibres are subject to a bend restriction, namely that they should not bend with a radius of curvature of less than about one meter, and so the cable itself is also limited in this way. This gives rise to problems at cable joints (a cable joint is a connection from cable to cable) and at termination joints (a termination joint connects a cable to a repeater, via what is known as a pig-tail). For example, a cable joint has a steel sleeve surrounding the joint, and the cables leaving this sleeve tend to bend sharply when subject to transverse forces, particularly as the cable is being laid or recovered around the forward or aft sheaves of a cable ship or around a cable engine drum. Similar problems arise with termination joints.

A known bend limiter is constituted by a boot made of artificial rubber. The boot is tapered sleeve-like member, which is about one meter in length, the boot having a steel coupling ring moulded into its wider end. The coupling ring is externally threaded for connection to the steel sleeve of a cable joint. The wider end of the boot is about 5 to 6 inches (127 to 152 mm) in diameter, and the bore of the boot is about 1.5 inches (38 mm), the dimensions being chosen to take standard commercial cables of diameter between 1 and 1.25 inches (25 and 31 mm). The known type of boot tapers so that the boot has a varying rigidity along its length. The conical shape of the boot also acts as a smooth contour profile to allow the diameter discontinuity of the cable-to-joint interface to pass through or around ship's machinery with much reduced risk of fouling. The boot rigidity is arranged to vary from a very high value at its wider end (to match the rigidity of the steel sleeve of the cable joint) to a relatively low value at its narrower end (to match the rigidity of the cable).

The disadvantage of this type of bend limiter is that different cables have different structures, and so have different flexibilities. This implies that they will have different allowable minimum bend radii, so that different boots are required for different cables. This is particularly disadvantageous for ships which are used to repair submarine optical fibre cables, as these ships will need to carry a large inventory of boots to suit the many different types of submarine cable presently in use. This problem is compounded by the fact that the British, French, Japanese and Americans all use different cable structures and different joints.

SUMMARY OF THE INVENTION

The present invention provides a bend restrictor for an optical fibre cable, the bend restrictor comprising an elongated sleeve-like member having an axial through bore for accommodating the cable, and a coupling ring for fixing the sleeve-like member to a rigid housing from which the cable extends, wherein the sleeve-like member is provided with a plurality of longitudinal bores, and wherein at least one of the bores is provided with a stiffening rod.

Advantageously, the sleeve-like member is made of a plastics material such as a cast polyurethane rubber, preferably a two-component, ambient temperature curing polyurethane elastomer having a Shore A Hardness, after 7 days' curing, of at least 72. Conveniently, the sleeve-like member has a length of substantially 1 m, the axial through bore of the sleeve-like member having a diameter of substantially 1.5 inches (38 mm), and the sleeve-like member tapering away from the coupling ring end thereof. The maximum external diameter of the sleeve-like member may lie within the range of from 4 to 8 inches (100 mm to 200 mm), and preferably is substantially 6 inches (150 mm).

In order to protect an optical fibre cable from excessive torsional forces, the narrow, free end portion of the sleeve-like member may be subdivided into a plurality of axially-extending finger portions, each of which is formed with a longitudinal aperture which forms part of a respective longitudinal bore. In this case, the bend restrictor may further comprise clamping means for clamping the finger portions firmly to an optical fibre cable accommodated within the axial through bore.

Preferably, each of the longitudinal bores has a diameter of 10 mm. Each of the stiffening rods may be made of pultruded glass fibre having a 50-75% glass fibre content within an embedding resin matrix.

BRIEF DESCRIPTION OF THE DRAWINGS

Two forms of optical fibre cable bend restrictor, each of which is constructed in accordance with the invention, will now be described, by way of example, with reference to the accompanying drawings, in which:

FIG. 1 is a longitudinal cross-sectional view of a cable joint region of an optical fibre cable, and shows two bend restrictors;

FIG. 2 is cross-sectional view, on a larger scale, of the central portion of the cable joint region of FIG. 1;

FIG. 3 is a cross-sectional view, on an enlarged scale, of the wider end portion of one of the bend restrictors of FIG. 1;

FIG. 4 is an end view, looking in the direction of the arrow A of FIG. 3, of the bend restrictor;

FIG. 5 is a schematic sectional view of the narrow end portion of a second form of bend restrictor; and FIG. 6 is a cross-section taken on the line VI—VI of FIG. 5.

DETAILED DESCRIPTION OF THE INVENTION

Referring to the drawings, FIG. 1 shows two sections 1a and 1b of an optical fibre cable, these sections being connected together by a cable joint assembly, indicated generally by the reference numeral 2. The cable joint assembly 2 includes a moulded cable joint 3 of standard construction, the joint being surrounded by a protective steel sleeve 4. The portions of the cable sections 1a and 1b adjacent to the cable joint assembly 2 are each provided with a bend restrictor (universal boot) 5 constructed in accordance with the invention.

As with prior art boots, the boots 5 are made of an artificial rubber (such as EMC 70B, which is a two-component, ambient temperature curing polyurethane system which yields a tough elastomer having a Shore A Hardness, after 7 days' curing, of about 72), and have a length of about 1 m. Each boot 5 has an internal diameter of 1.5 inches (38 mm), and has an external diameter which tapers from 6 inches (150 mm), at the end thereof adjacent to the cable joint assembly 2, to about 1.75 inches (45 mm) at the opposite end. Each boot 5 is fixed to the sleeve 4 by means of a respective coupling ring 6. Each coupling ring 6 has a generally cylindrical, externally-threaded portion 4a which is threadably engageable with an internally-threaded end portion 4a of the sleeve 4. The coupling rings 6 are generally crown-shaped, having prongs 6b which are moulded into the wider end portions 5a of the boots 5.

As shown in FIGS. 3 and 4, each boot 5 is formed with six equispaced, symmetrically-positioned, longitudinal bores 7, whose mouths 7a lie on the annular end face of the boot adjacent to the associated coupling ring 6. In use, some or all of these bores 7 are occupied by stiffening rods 8 made of pultruded glass fibre having 50-75% glass fibre within an embedding resin matrix. The bores 7 have a diameter of 10 mm and a length of 80 mm, and the rods 8 can have various lengths up to this length. Thus, by varying the number and the lengths of the rods 8 used, the rigidity of the boots 5 can be varied to suit the rigidity of any type of optical fibre cable. Consequently, only one type of boot is needed for a wide range of optical fibre cables, and so the inventory costs and storage space for such items is reduced compared with known systems. This is particularly advantageous on board repair ships. Moreover, the rods 8 can be made in standard lengths, and cut to the sizes required in situ, so again inventory costs are minimised. It should also be noted that, as repair joints are often the same as manufacturing joints, this type of boot can be used in the factory and on board ship. It can also be used with any type of joint or termination to which this profile of boot can be attached.

Furthermore, the boot 5 can be used with all standard commercial optical fibre cables. Where the outer diameter of such a cable is significantly less than the 1.5 inch (38 mm) internal bore of the boot 5, the clearance between the two can be reduced by wrapping suitable material round the cable within the bore of the boot. In this way, cables down to an outer diameter of 0.75 inch (19 mm) can be accommodated. For cables having a smaller diameter than this (for example, specialised or military cables), a boot having an internal bore of 0.75 inch (19 mm) would be preferable. Such small diameter cables are, however, extremely specialised and rare, and so their existence does not materially affect the universality of application of the boot of the invention.

Although the boot described above is intended primarily to prevent excessive bending of an associated optical fibre cable, it also helps to prevent excessive torsional forces affecting such a cable. Where additional protection against torsional forces is required, the boot could be modified, for example as shown in FIGS. 5 and 6. The boot shown in FIGS. 5 and 6 is similar to that shown in FIGS. 1 to 4, so only the modified parts of this boot will be described in detail, and like reference numerals (with the addition of 10) will be used for like parts. Thus, FIG. 5 shows the narrow end portion 15a of a modified form of boot 15. The narrow end portion 15a is subdivided to form six equispaced axially-extending fingers 15b, each of which is formed with a longitudinal bore which forms part of a respective bore 17 in the main body of the boot 15. A pair of axially-spaced retaining clips 29 are provided for clamping the fingers 15b (and hence any stiffening rods 18 positioned therein) firmly to the associated optical fibre cable 11. As the portion 15a of the boot 15 is clamped firmly to the cable 11, the cable is protected from excessive torsional forces. Moreover, the arrangement of the fingers 15b and the clips 29 is such that the boot portion 15a can be clamped to cables 11 of different diameters. Thus, the modified boot 15 can also be used with all standard commercial optical fibre cables.

Although the universal boots described above are described only as for use with cable joints, it will be apparent that they could also be used as bend restrictors for use with termination joints on repeater casings or branching units, or indeed with any other component which gives rise to the possibility of an associated optical fibre cable bending excessively.

I claim:

1. A bend restrictor for an optical fibre cable, the bend restrictor comprising an elongated sleeve-like member having an axial through bore for accommodating the cable, and a coupling ring for fixing the sleeve-like member to a rigid housing from which the cable extends, wherein the sleeve-like member is provided with a plurality of longitudinal bores, and wherein at least one of the bores is provided with a stiffening rod.

2. A bend restrictor as claimed in claim 1, wherein the sleeve-like member is made of a plastics material.

3. A bend restrictor as claimed in claim 2, wherein the sleeve-like member is made of a cast polyurethane rubber.

4. A bend restrictor as claimed in claim 3, wherein the cast polyurethane rubber is a two-component, ambient temperature curing polyurethane elastomer having a Shore A Hardness, after 7 days' curing, of at least 72.

5. A bend restrictor as claimed in claim 1, wherein the sleeve-like member has a length of substantially 1 m, the axial through bore of the sleeve-like member having a diameter of substantially 1.5 inches (38 mm), and the sleeve-like member tapering away from the coupling ring end thereof.

6. A bend restrictor as claimed in claim 5, wherein the maximum external diameter of the sleeve-like member lies within the range of from 4 to 8 inches (100 mm to 200 mm).

7. A bend restrictor as claimed in claim 6, wherein the maximum external diameter of the sleeve-like member is substantially 6 inches (150 mm).

8. A bend restrictor as claimed in claim 5, wherein the narrow, free end portion of the sleeve-like member is subdivided into a plurality of axially-extending finger portions, each of which is formed with a longitudinal aperture which forms part of a respective longitudinal bore.

9. A bend restrictor as claimed in claim 8, further comprising clamping means for clamping the finger portions firmly to an optical fibre cable accommodated within the axial through bore.

10. A bend restrictor as claimed in claim 1, wherein each of the longitudinal bores has a diameter of 10 mm.

11. A bend restrictor as claimed in claim 1, wherein each of the stiffening rods is made of pultruded glass fibre having a 50-75% glass fibre content within an embedding resin matrix.

* * * * *